US012652691B2

(12) United States Patent
Zhu et al.

(10) Patent No.: US 12,652,691 B2
(45) Date of Patent: Jun. 9, 2026

(54) DOWNLINK BEAM LEVEL MANAGEMENT

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 593 days.

(21) Appl. No.: 17/661,521

(22) Filed: Apr. 29, 2022

(65) Prior Publication Data

US 2023/0354396 A1     Nov. 2, 2023

(51) Int. Cl.
*H04W 72/542*     (2023.01)
*H04L 1/00*     (2006.01)
*H04W 16/28*     (2009.01)
*H04W 72/044*     (2023.01)
*H04W 72/23*     (2023.01)

(52) U.S. Cl.
CPC ......... *H04W 72/542* (2023.01); *H04L 1/0008* (2013.01); *H04W 16/28* (2013.01); *H04W 72/046* (2013.01); *H04W 72/23* (2023.01)

(58) Field of Classification Search
CPC . H04W 72/542; H04W 16/28; H04W 72/046; H04W 72/23; H04L 1/0008; H04B 7/088; H04B 7/0404
See application file for complete search history.

(56) References Cited

U.S. PATENT DOCUMENTS

| | | | |
|---|---|---|---|
| 10,785,695 B1 * | 9/2020 | Marupaduga ....... | H04W 36/165 |
| 2018/0317119 A1 * | 11/2018 | Fu .......................... | H04W 24/08 |
| 2019/0044578 A1 | 2/2019 | Rao et al. | |
| 2019/0356438 A1 | 11/2019 | Lee et al. | |
| 2020/0412425 A1 | 12/2020 | Laghate et al. | |
| 2023/0052406 A1 * | 2/2023 | Ma | |

(Continued)

FOREIGN PATENT DOCUMENTS

| | | | | |
|---|---|---|---|---|
| EP | 4243200 A4 * | 5/2024 | .............. | H01Q 1/22 |
| WO | WO-2017196249 A1 * | 11/2017 | .......... | H04B 7/0486 |
| WO | 2020033622 A1 | 2/2020 | | |

(Continued)

OTHER PUBLICATIONS

International Search Report and Written Opinion—PCT/US2023/017171—ISA/EPO—Jul. 28, 2023.

*Primary Examiner* — Sujoy K Kundu
*Assistant Examiner* — Samuel Dilan Rutnam
(74) *Attorney, Agent, or Firm* — Harrity & Harrity LLP

(57) ABSTRACT

Various aspects of the present disclosure generally relate to wireless communication. In some aspects, a user equipment (UE) may obtain, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE. The UE may modify a beam level associated with the downlink beam based at least in part on the downlink information. Numerous other aspects are provided.

30 Claims, 7 Drawing Sheets

600 →

610 ~ Obtain, in association with a downlink beam for receiving downlink communications, downlink information indicating at least one of an amount of downlink traffic to be received by the UE via the downlink beam, at least one channel quality metric associated with the downlink beam, or an application downlink throughput metric associated with one or more applications of the UE 620 ~ Modify a beam level associated with the downlink beam based at least in part on the downlink information

(56)     References Cited

U.S. PATENT DOCUMENTS

2023/0254027 A1 * 8/2023 Zhu ..................... H04B 17/309
                                                    375/267
2024/0015565 A1 * 1/2024 Gandhi ............ H04W 28/0263

FOREIGN PATENT DOCUMENTS

WO     WO-2020076442 A1 * 4/2020 ........... H04B 7/0617
WO     WO-2022143148 A1 * 7/2022 ............... H01Q 1/22

* cited by examiner

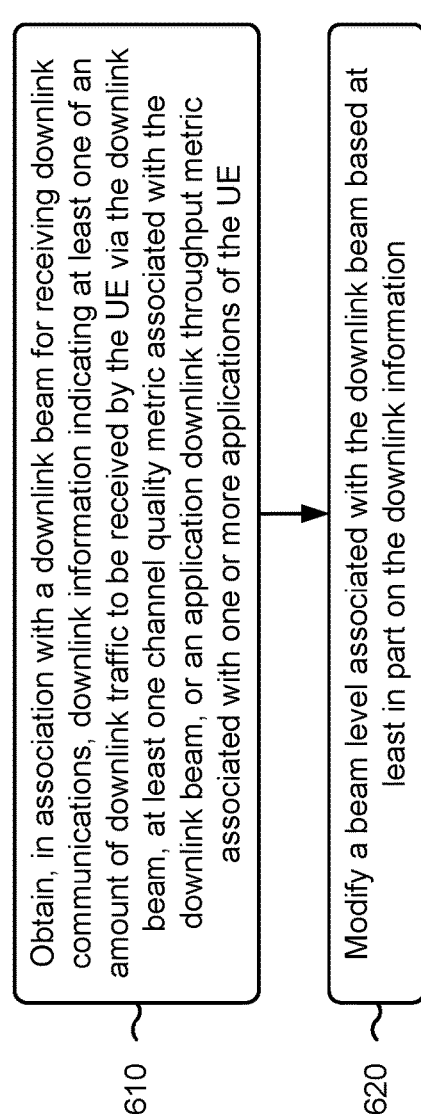

Obtain, in association with a downlink beam for receiving downlink communications, downlink information indicating at least one of an amount of downlink traffic to be received by the UE via the downlink beam, at least one channel quality metric associated with the downlink beam, or an application downlink throughput metric associated with one or more applications of the UE

610

Modify a beam level associated with the downlink beam based at least in part on the downlink information

DOWNLINK BEAM LEVEL MANAGEMENT

FIELD OF THE DISCLOSURE

Aspects of the present disclosure generally relate to wireless communication and specifically, to techniques and apparatuses for downlink beam level management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining, in association with a downlink beam for receiving downlink communications, downlink information indicating at least one of, an amount of downlink traffic to be received by the UE via the downlink beam, at least one channel quality metric associated with the downlink beam, or an application downlink throughput metric associated with one or more applications of the UE. The method may include modifying a beam level associated with the downlink beam based at least in part on the downlink information.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to obtain, in association with a downlink beam for receiving downlink communications, downlink information indicating at least one of. The processor-readable code, when executed by the at least one processor, may be configured to cause the user equipment to modify a beam level associated with the downlink beam based at least in part on the downlink information.

Some aspects described herein relate to a non-transitory computer-readable medium that stores a set of instructions for wireless communication by a UE. The set of instructions, when executed by one or more processors of the UE, may cause the UE to obtain, in association with a downlink beam for receiving downlink communications, downlink information indicating at least one of. The set of instructions, when executed by one or more processors of the UE, may cause the UE to modify a beam level associated with the downlink beam based at least in part on the downlink information.

Some aspects described herein relate to an apparatus for wireless communication. The apparatus may include means for obtaining, in association with a downlink beam for receiving downlink communications, downlink information indicating at least one of, an amount of downlink traffic to be received by the UE via the downlink beam, at least one channel quality metric associated with the downlink beam, or an application downlink throughput metric associated with one or more applications of the UE. The apparatus may include means for modifying a beam level associated with the downlink beam based at least in part on the downlink information.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a flowchart illustrating an example process performed, for example, by a UE in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Figure 1:
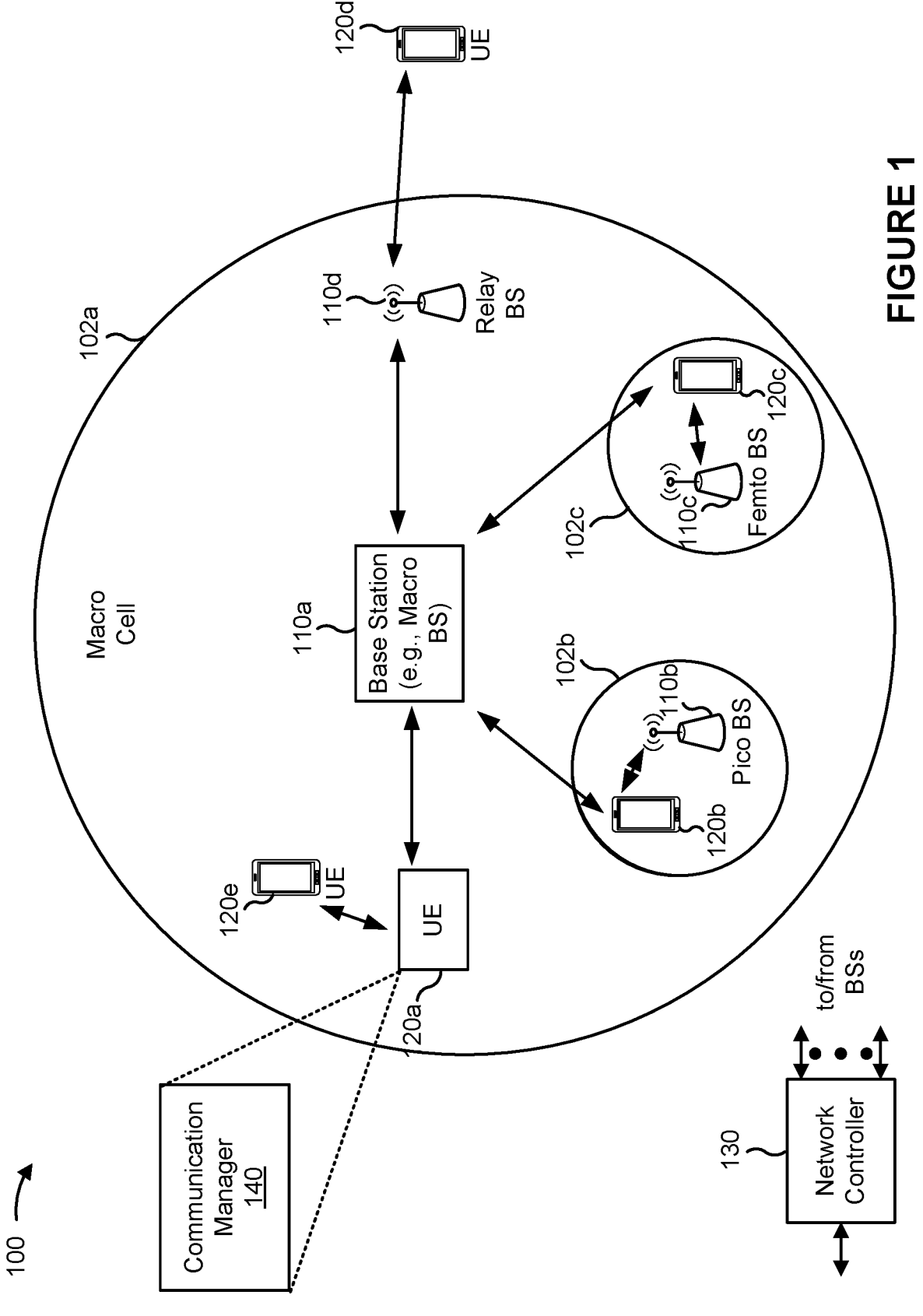
FIG. 1 is a diagram illustrating an example of a wireless network in accordance with the present disclosure.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*, also referred to as a network entity), a user equipment (UE) 120 or multiple UEs 120 (shown as a UE

120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may obtain, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE; and modify a beam level associated with the downlink beam based at least in part on the downlink information. Additionally, or alternatively, the communication manager 140 may perform one or more other operations described herein.

Figure 2:
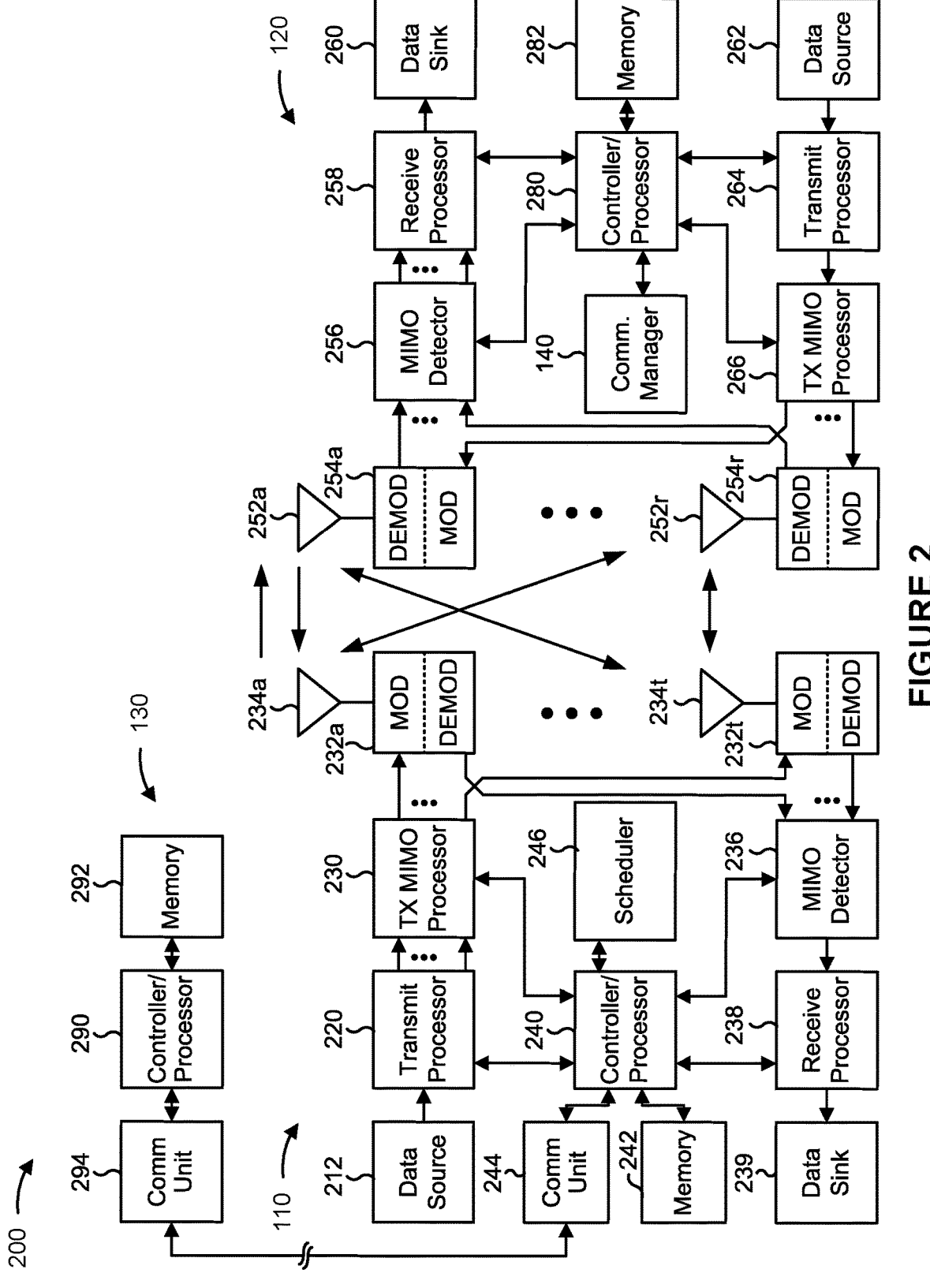
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

Deployment of communication systems, such as 5G New Radio (NR) systems, may be arranged in multiple manners with various components or constituent parts. In a 5G NR system, or network, a network entity, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

The controller/processor 240 of the base station 110, the controller/processor 280 of the UE 120, or any other component(s) of FIG. 2 may perform one or more techniques associated with downlink beam level management, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, or other processes as described herein. In some examples, executing instructions may include running the instructions, converting the instructions, compiling the instructions, or interpreting the instructions, among other examples.

In some aspects, the UE includes means for obtaining, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE; and/or means for modifying a beam level associated with the downlink beam based at least in part on the downlink information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
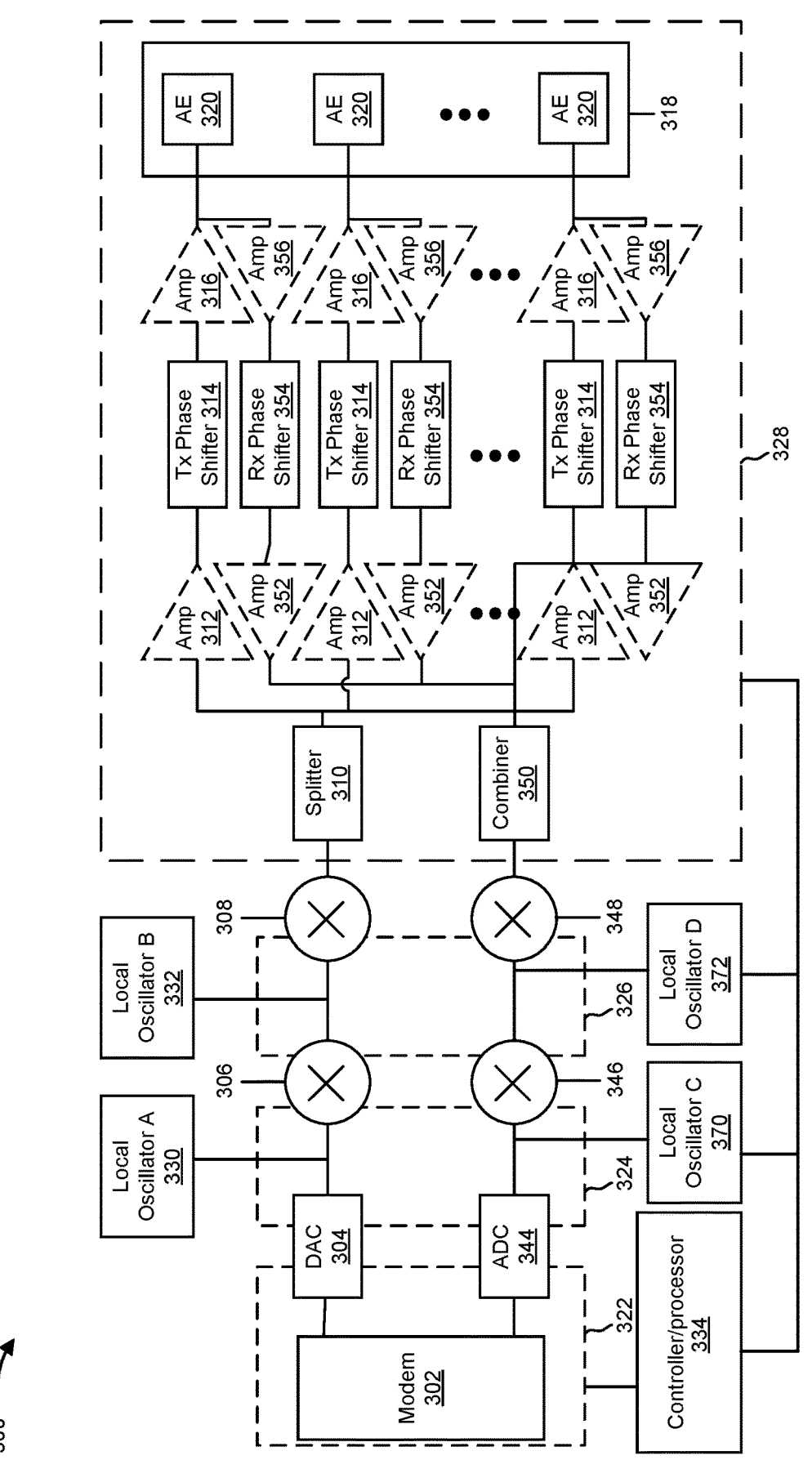
FIG. 3 is a diagram illustrating an example beamforming architecture that supports beamforming for millimeter wave (mmW) communications, in accordance with the present disclosure in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (for example, a first wireless communication device, UE, or base station) and/or a receiving device (for example, a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized sig- nals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (for example, to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication stan- dard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second ampli- fier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (for example, by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or pre- vents insertion loss. The settings of each of the phase shifters 314 are independent, meaning that each can be indepen- dently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first ampli- fiers 356 may be connected to the same antenna arrays 318 (for example, for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are indepen- dent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (for example, not connected to a power source), which may result in some insertion loss. The combiner 350 may be an active combiner (for example, connected to a power source), which may result in some signal gain. When combiner 350 is an active combiner, it may provide a different (for example, configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (for example, represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (for example, for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
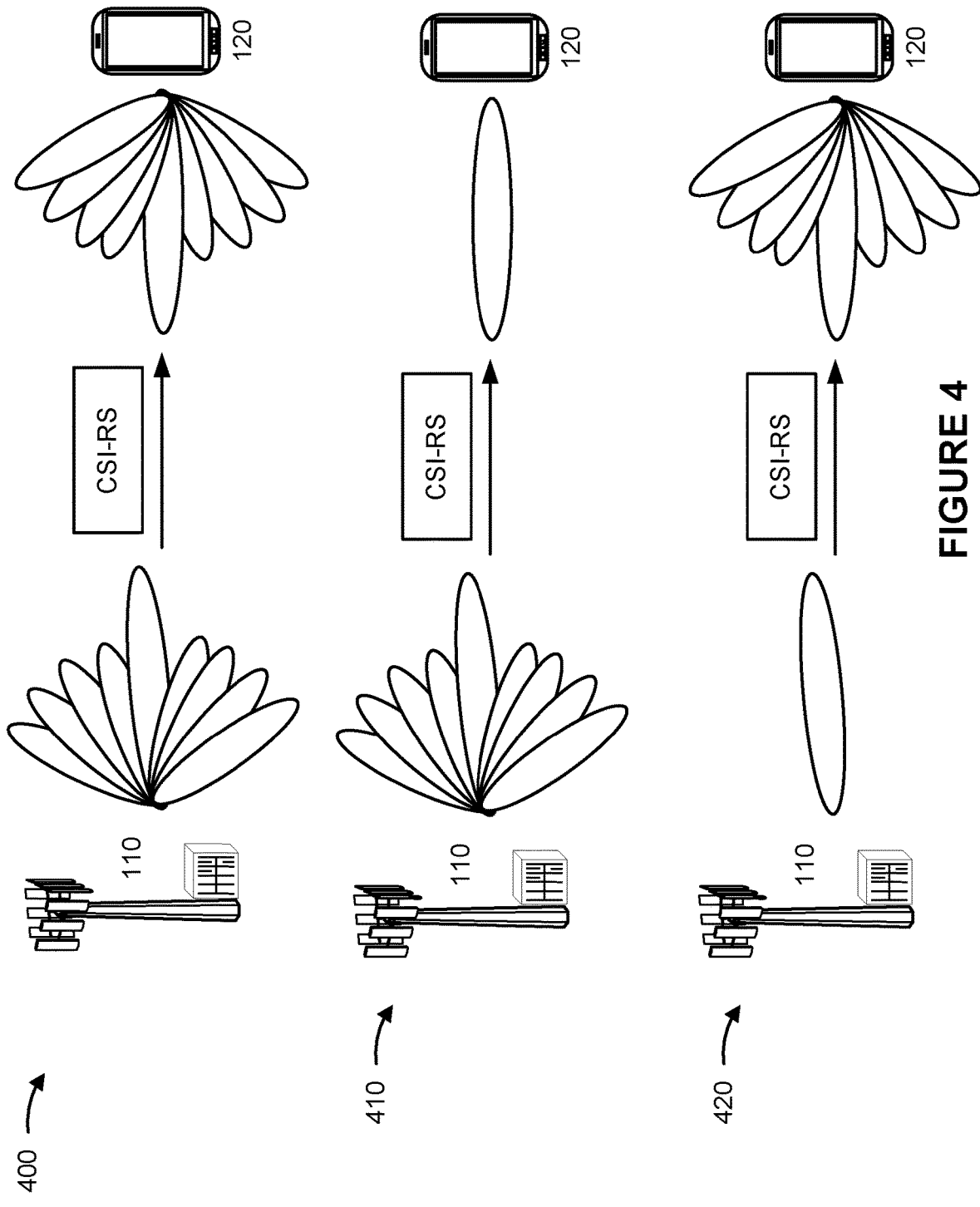
FIG. 4 is a diagram illustrating an example associated with diagram illustrating examples of channel state information (CSI) reference signal (RS) beam management procedures, in accordance with the present disclosure in accordance with the present disclosure.

FIG. 4 is a diagram illustrating examples 400, 410, and 420 of channel state information reference signal (CSI-RS) beam management procedures, in accordance with the present disclosure. As shown in FIG. 4, examples 400, 410, and 420 include a UE 120 in communication with a base station 110 (for example, a network entity) in a wireless network (for example, wireless network 100). However, the devices shown in FIG. 4 are provided as examples, and the wireless network may support communication and beam management between other devices (for example, between a UE 120 and a base station 110 or transmit receive point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (for example, an radio resource control (RRC) connected state).

As shown in FIG. 4, example 400 may include a base station 110 and a UE 120 communicating to perform beam management using CSI-RSs. Example 400 depicts a first beam management procedure (for example, P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the base station 110 to the UE 120. The CSI-RSs may be configured to be periodic (for example, using RRC signaling), semi-persistent (for example, using media access control (MAC) control element (MAC-CE) signaling), and/or aperiodic (for example, using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (for example, with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 400 has been described in connection with CSI-RSs, the first beam management process may also use synchronization signal blocks (SSBs) for beam management in a similar manner as described above.

As shown in FIG. 4, example 410 may include a base station 110 and a UE 120 communicating to perform beam management using CSI-RSs. Example 410 depicts a second beam management procedure (for example, P2 CSI-RS beam management). The second beam management procedure may be referred to as a beam refinement procedure, a base station beam refinement procedure, a TRP beam refinement procedure, and/or a transmit beam refinement procedure. As shown in FIG. 4 and example 410, CSI-RSs may be configured to be transmitted from the base station 110 to the UE 120. The CSI-RSs may be configured to be aperiodic (for example, using DCI). The second beam management procedure may include the base station 110 performing beam sweeping over one or more transmit beams. The one or more transmit beams may be a subset of all transmit beams associated with the base station 110 (for example, determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (for example, a same) receive beam (for example, determined based at least in part on measurements performed in connection with the first beam management ment procedure). The second beam management procedure may enable the base station 110 to select a best transmit beam based at least in part on measurements of the CSI-RSs (for example, measured by the UE 120 using the single receive beam) reported by the UE 120.

As shown in FIG. 4, example 420 depicts a third beam management procedure (for example, P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the base station 110 to the UE 120. The CSI-RSs may be configured to be aperiodic (for example, using DCI). The third beam management process may include the base station 110 transmitting the one or more CSI-RSs using a single transmit beam (for example, determined based at least in part on measurements reported by the UE 120 in connection with the first beam management procedure and/or the second beam management procedure). To enable the UE 120 to perform receive beam sweeping, the base station may use a transmit beam to transmit (for example, with repetitions) CSI-RS at multiple times within the same RS resource set so that UE 120 can sweep through one or more receive beams in multiple transmission instances. The one or more receive beams may be a subset of all receive beams associated with the UE 120 (for example, determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (for example, of the CSI-RS of the transmit beam using the one or more receive beams).

In some cases, the UE 120 and the base station 110 may use beamforming to improve performance associated with downlink and/or uplink communication over a millimeter wave (mmW) channel. For example, to achieve a beamforming gain on a downlink, the base station 110 may generate a downlink transmit beam that is steered in a particular direction and the UE 120 may generate a corresponding downlink receive beam. Similarly, to achieve a beamforming gain on an uplink, the UE 120 may generate an uplink transmit beam that is steered in a particular direction and the base station 110 may generate a corresponding downlink receive beam. In some cases, the UE 120 may be permitted to select the downlink receive beam to optimize reception of a downlink transmission from the base station 110 and/or may be permitted to select the uplink transmit beam to optimize reception at the base station 110 for an uplink transmission by the UE 120.

When the UE 120 generates a downlink receive beam and/or an uplink transmit beam, the UE 120 may generally be configured to use a beam with a maximum beam level (for example, a maximum number of antenna elements) on a best antenna panel in order to achieve a maximum beamforming gain. For example, the UE 120 may be equipped with one or more antenna panels that each include multiple antenna elements, where each antenna element may include one or more sub-elements to radiate or receive radio frequency (RF) signals. The shape of a beam (for example, the amplitude, width, and/or presence of side lobes) and the direction of the beam (for example, an angle of the beam relative to a surface of the antenna panel) can be dynamically controlled to achieve a maximum beamforming gain by selecting a beam with a largest number of antenna elements on the best antenna panel (for example, an antenna panel associated with strongest RSRP measurements).

However, in some cases, using a beam at a maximum beam level (for example, with a largest or maximum number of antenna elements) may be associated with one or more drawbacks. For example, power consumption at the UE 120 may generally be related to the beam level, whereby using a beam with a maximum beam level may increase power consumption at the UE 120. Furthermore, in cases where the UE 120 uses a downlink receive beam at maximum beam level in favorable channel conditions (for example, high RSRP, low pathloss, and/or the like), the maximum beam level may increase power consumption without offering any meaningful increase to downlink throughput and/or the achievable beamforming gain (for example, the same beamforming gain may be achieved using a lower beam level, or fewer active antenna elements). In addition, the beam level may have a thermal impact on the UE 120, as higher beam levels typically generate more heat than lower beam levels. Accordingly, using a maximum beam level may have a high thermal cost relative to using a lower beam level.

As indicated above, FIG. 4 is provided as an example of beam management procedures. Other examples of beam management procedures may differ from what is described with respect to FIG. 4. For example, the UE 120 and the base station 110 may perform the third beam management procedure before performing the second beam management procedure, and/or the UE 120 and the base station 110 may perform a similar beam management procedure to select a UE transmit beam.

Various aspects relate generally to downlink beam level management, where a UE is capable of selecting, and dynamically updating, a beam level for a downlink receive beam. Some aspects more specifically relate to a UE using downlink information associated with downlink communications (for example, an amount of downlink traffic, downlink channel quality metrics, UE application throughput requirements, and/or the like) to select and/or modify a beam level (for example, number of active antenna elements) of a downlink receive beam used for the downlink communications. For example, by comparing metrics associated with the downlink information to one or more thresholds, the UE may be able to determine whether a beam level should be increased or decreased. In some aspects, the UE may continue to modify the beam level of a downlink receive beam over time, as conditions (for example, indicated by the downlink information) change.

Particular aspects of the subject matter described in this disclosure can be implemented to realize one or more of the following potential advantages. In some examples, the described techniques can be used to initialize and/or dynamically modify the beam level of a downlink receive beam. The ability to modify the beam level may enable a UE to reduce power consumption and thermal costs when a maximum beam level is not required. As the state of downlink communications with the UE changes, the UE is able to adapt, by increasing and/or decreasing the beam level, in a manner designed to satisfy downlink traffic requirements. The dynamic modification of beam levels may enable the UE to conserve power and control thermal costs without sacrificing the performance (for example, throughput) of downlink communications.

Figure 5:
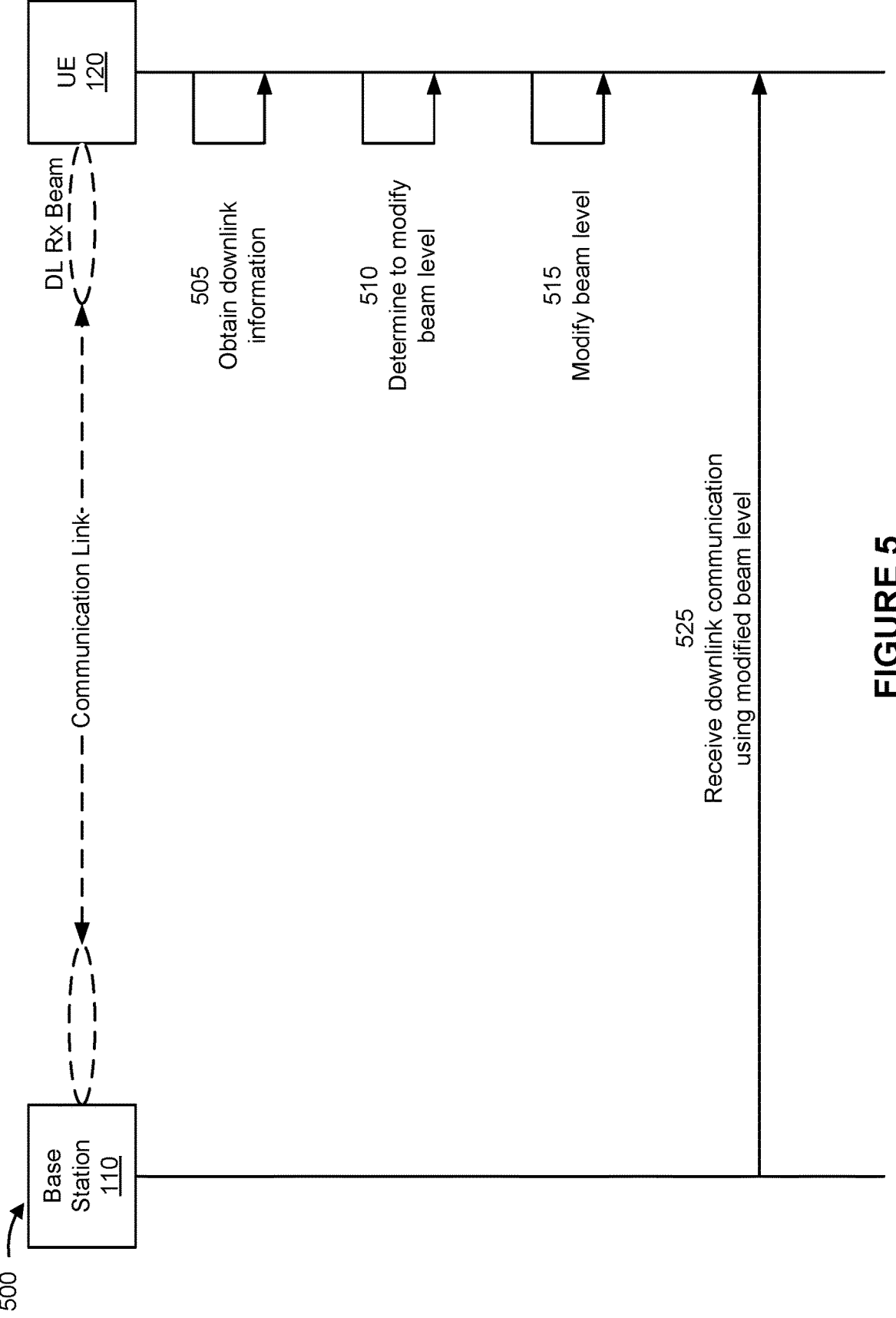
FIG. 5 is a diagram illustrating an example associated with downlink beam level management, in accordance with the present disclosure.

FIG. 5 is a diagram illustrating an example 500 associated with downlink beam level management, in accordance with the present disclosure. As shown in FIG. 5, a network entity (for example, base station 110) and a UE 120 may communicate with one another. In this example 500, the UE 120 and network entity may be in the process of establishing a communication link or may have already have an established communication link (for example, using the beam management procedures described herein). For example, the downlink beam level management features described herein may be performed during initial beam generation and establishment of a communication link and/or performed after an initial beam management procedure has established the communication link (for example, to refine the beam level). In some aspects, the downlink receive beam of the UE (referred to herein as the "downlink beam") may be initialized at a maximum beam level (for example, with a maximum number of antenna elements). In some aspects, the downlink beam may be initialized with a beam level other than a maximum beam level.

As shown by reference number 505, the UE may obtain, in association with a downlink beam for receiving downlink communications, downlink information. The downlink information may indicate, for example, a variety of characteristics, metrics, and/or the like, associated with a downlink communications channel between the UE and the network entity. For example, the downlink information may indicate an amount of downlink traffic to be received by the UE via the downlink beam, at least one channel quality metric associated with the downlink beam, or an application downlink throughput metric associated with one or more applications of the UE.

In some aspects, the downlink information may be obtained by performing beam sweeping, as described herein. For example, during a beam sweeping procedure, the UE may obtain one or more channel quality metrics, such as an RSRP, signal-to-noise ratio (SNR), and/or spectral efficiency (SPEFF). The channel quality metrics may also be obtained by measuring periodic and/or aperiodic reference signals transmitted during communications between the network entity and the UE.

The amount of downlink traffic to be received by the UE may indicate the amount of traffic the UE is expecting to receive in the future. For example, the UE may determine, or predict, the amount of downlink traffic to be received based on a number of downlink grants received, a number of allocated resource blocks (RBs), a transport block (TB) size, and the inclusion of padding in downlink grants. For example, if multiple downlink grants are received within a particular period of time, the UE may assume that it is likely to receive more downlink grants in an upcoming period of time. Conversely, if very few or no downlink grants are received, the UE may assume that it is not likely to receive more downlink grants in the upcoming period of time. Similarly, if RBs for downlink communications are full or near-full (for example, satisfying a threshold to be identified as full), and/or if a TB size meets a threshold, the UE may determine or predict that more downlink traffic is incoming in an upcoming period of time. On the other hand, RBs that are not full or near empty, and/or TB sizes that are relatively small (for example, do not satisfy a threshold RB size), may indicate that less downlink traffic, or no downlink traffic, is expected to arrive in an upcoming period of time. As another example, the existence of padding in a downlink grant may indicate that future downlink traffic is less likely, while the absence of padding may indicate that more downlink traffic is likely. In some aspects, the UE may use any information indicating the amount of future downlink traffic, or any combination of the information indicating the amount of future downlink traffic, to determine whether the beam level should be modified and/or determine how much to modify the beam level.

In some aspects, the channel quality metric(s) may indicate the quality of the downlink communications channel using the downlink communications beam at its current beam level. Example channel quality metrics may include RSRP, SNR, SPEFF, and/or throughput. In some aspects, the application downlink throughput metric may indicate the throughput requested and/or required by one or more applications operating on the UE. For example, some applications may have a relatively low throughput requirement, such as web browsing or voice over internet protocol applications. Some applications may have a moderate throughput requirement, such as video streaming applications. Some applications may have a relatively high throughput requirement, such as applications for speed tests or large file downloads. The foregoing are merely examples, and some applications may change requirements during operation. In some aspects, the application downlink throughput metric obtained by the UE may indicate one of a plurality of tiered throughput categories associated with throughput requirements of one or more of the applications, or all of the applications, operating on the UE. For example, a first tier (for example, a low throughput requirement tier) may be for throughput less than 10 Mbps, a second tier (for example, a medium throughput requirement tier) may be for throughput between 10 and 100 Mbps, and a third tier (for example, a high throughput requirement tier) may be for throughput greater than 100 Mbps. The foregoing tiers are merely an example, more or fewer tiers could be used, and different thresholds could be used to determine which tier is associated with which amount(s) of throughput.

As shown by reference number 510, the UE may determine that the beam level is to be modified based at least in part on the downlink information. In some aspects, the UE may determine to increase or decrease the beam level based at least in part on comparing downlink traffic metrics to one or more thresholds. For example, in a situation where one or more downlink traffic metrics satisfy an upper downlink traffic threshold, the UE may determine to increase the beam level (for example, to improve beamforming gain and/or enable higher throughput). By way of example, the UE may determine to increase the beam level based at least in part on a number of downlink grants over a period of time satisfy an upper threshold for the number of grants, a number of allocated RBs in downlink communications received over a period of time satisfying an upper threshold for the quantity of allocated RBs, a TB size of downlink communications received over a period of time satisfying an upper threshold for the TB size, and/or a padding size of padding included in one or more downlink grants satisfying an upper threshold for the padding size. Similarly, in a situation where the one or more downlink traffic metrics satisfy a lower downlink traffic threshold, the UE may determine to decrease the beam level (for example, to reduce power consumption and/or thermal costs at the UE). Lower downlink traffic thresholds may be used in a manner similar to the upper downlink traffic thresholds described herein.

In some aspects, the UE may determine to increase or decrease the beam level based at least in part on comparing downlink channel quality metrics to one or more thresholds. For example, in a situation where downlink RSRP, SNR, SPEFF, and/or throughput falls below a corresponding threshold (for example, satisfies, or fails to satisfy, respective lower channel quality thresholds), the UE may determine to increase the beam level (for example, to improve the downlink channel quality metrics). Similarly, in a situation where the downlink channel quality metrics satisfy one or more upper thresholds, the UE may determine to decrease the beam level (for example, to reduce power consumption and/or thermal costs at the UE).

In some aspects, the UE may determine to increase or decrease the beam level based at least in part on comparing the application downlink throughput metric to one or more thresholds. For example, in a situation where application downlink throughput requirements are relatively high (for example, satisfy an upper application downlink throughput threshold, are categorized in a high tier of application throughput, and/or the like), the UE may determine to increase the beam level (for example, to improve beamforming gain and meet the high throughput demands). In a situation where the application downlink throughput requirements are relatively low (for example, satisfy a lower application downlink throughput threshold, are categorized in a low tier of application throughput, and/or the like), the UE may determine to decrease the beam level (for example, to reduce power consumption and/or thermal costs at the UE). In a situation where the application downlink throughput requirements are moderate (for example, do not satisfy the upper or lower application downlink throughput thresholds, are categorized in a medium tier of application throughput, and/or the like), the UE may determine that the beam level is not to be modified.

In some aspects, a combination of thresholds may be used to determine whether the beam level is to be modified, to determine whether the beam level is to increase or decrease, and/or to determine an amount by which the beam level is to be modified. For example, the UE may use satisfaction of a certain threshold, or one or more combinations of thresholds, to determine whether to increase and/or decrease the beam level. In some aspects, one or more thresholds and/or metrics may be weighted differently from other thresholds and/or metrics for the purpose of determining whether the beam level is to be modified, determining whether the beam level is to increase or decrease, and/or to determine an amount by which the beam level is to be modified. For example, in a situation where multiple metrics and/or thresholds indicate beam level modifications (sometimes in different directions), a weight or ordered priority may be used. By way of example, for channel quality metrics, whether the beam level is to increase or decrease may be determined by following an ordered priority of throughput, SPEFF, SNR, and RSRP, such that the first of the foregoing metrics that indicates an increase or decrease (for example, based on comparison to a corresponding threshold) has priority over the other metrics.

In some aspects, one or more of the metrics associated with the downlink information may have multiple thresholds, such as tiered thresholds, whereby different thresholds may have a different weight and/or priority, and/or different thresholds may indicate different beam level changes. For example, the UE may determine that a throughput value that satisfies a first upper throughput threshold should cause an increase in beam level by one step (for example, activation of one additional antenna element), while a throughput value that satisfies a second upper throughput threshold (for example, greater than the first upper throughput threshold) should cause an increase in beam level by two steps (for example, activation of two additional antenna elements). In some aspects, metrics and/or thresholds may be associated with one or more preconfigured windows of time. For example, each metric may be collected over one preconfigured window of time, or separate metrics may be collected over different preconfigured windows of time.

As shown by reference number 515, the UE may modify the beam level associated with the downlink beam based at least in part on the downlink information. For example, the UE may increase a number of active antenna elements associated with the downlink beam or decrease a number of active antenna elements associated with the downlink beam. In some aspects, the UE may modify the beam level based at least in part on determining that the beam level is to be modified, as described herein. For example, based on determining that the beam level should be increased (for example, as a result of a comparison of at least one metric included in the downlink information to one or more thresholds), the UE may activate an additional antenna element for a downlink beam being used to received downlink communications from the network entity.

As shown by reference number 520, the UE may use the modified beam level to receive one or more downlink communications from the network entity. For example, while the downlink beam may have been initialized at a maximum beam level, the UE may decrease the beam level based on the downlink information and continue to receive downlink traffic via the downlink beam at the decreased beam level.

In some aspects, the UE may repeat one or more of the steps described in the example 500. For example, the UE may obtain downlink information, determine to modify the beam level, and/or modify the beam level periodically and/or based on a trigger (for example, a trigger based on a change in the downlink information, a beam change, a triggering signal from the network entity, and/or the like).

As indicated above, FIG. 5 is provided as an example. Other examples may differ from what is described with respect to FIG. 5.

Particular aspects of the subject matter described in this disclosure can be implemented to realize one or more of the following potential advantages. In some examples, the described techniques can be used to initialize and/or dynamically modify the beam level of a downlink receive beam. The ability to modify the beam level may enable a UE to reduce power consumption and thermal costs when a maximum beam level is not required. As the state of downlink communications with the UE changes, the UE is able to adapt, by increasing and/or decreasing the beam level, in a manner designed to satisfy downlink traffic requirements. The dynamic modification of beam levels may enable the UE to conserve power and control thermal costs without sacrificing the performance (for example, throughput) of downlink communications.

FIG. 6 is a flowchart illustrating an example process 600 performed, for example, by a user equipment (UE) in accordance with the present disclosure. Example process 600 is an example where the UE (for example, UE 120) performs operations associated with downlink beam level management.

As shown in FIG. 6, in some aspects, process 600 may include obtaining, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE (block 610). For example, the UE (such as by using communication manager 140 or downlink component 708, depicted in FIG. 7) may obtain, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE, as described above.

As further shown in FIG. 6, in some aspects, process 600 may include modifying a beam level associated with the downlink beam based at least in part on the downlink information (block 620). For example, the UE (such as by using communication manager 140 or modification component 712, depicted in FIG. 7) may modify a beam level associated with the downlink beam based at least in part on the downlink information, as described above.

Process 600 may include additional aspects, such as any single aspect or any combination of aspects described below or in connection with one or more other processes described elsewhere herein.

In a first additional aspect, process 600 includes determining that the beam level is to be modified based at least in part on the downlink information, and wherein modifying the beam level comprises modifying the beam level based at least in part on the determination that the beam level is to be modified.

In a second additional aspect, alone or in combination with the first aspect, determining that the beam level is to be modified comprises determining to increase the beam level based at least in part on at least one of at least one downlink traffic metric satisfying at least one downlink traffic threshold, the at least one channel quality metric satisfying at least one channel quality threshold, or the application downlink throughput metric satisfying an application throughput threshold.

In a third additional aspect, alone or in combination with one or more of the first and second aspects, determining that the beam level is to be modified comprises determining to decrease the beam level based at least in part on at least one of at least one downlink traffic metric satisfying at least one downlink traffic threshold, the at least one channel quality metric satisfying at least one channel quality threshold, or the application downlink throughput metric satisfying an application throughput threshold.

In a fourth additional aspect, alone or in combination with one or more of the first through third aspects, modifying the beam level comprises increasing a number of active antenna elements associated with the downlink beam, or decreasing a number of active antenna elements associated with the downlink beam.

In a fifth additional aspect, alone or in combination with one or more of the first through fourth aspects, the amount of downlink traffic is indicated by at least one of a quantity of downlink grants received by the UE in downlink communications received by the UE within a period of time, a quantity of allocated resource blocks in downlink communications received by the UE within a period of time, a transport block size of downlink communications received by the UE within a period of time, or padding included in one or more of the downlink grants.

In a sixth additional aspect, alone or in combination with one or more of the first through fifth aspects, the at least one channel quality metric comprises at least one of a reference signal received power metric, a signal-to-noise ratio metric, a spectral efficiency metric, or a throughput metric.

In a seventh additional aspect, alone or in combination with one or more of the first through sixth aspects, the application downlink throughput metric indicates one of a plurality of tiered throughput categories associated with the one or more applications.

In an eighth additional aspect, alone or in combination with one or more of the first through seventh aspects, obtaining the downlink information includes performing beam sweeping to collect the downlink information.

In a ninth additional aspect, alone or in combination with one or more of the first through eighth aspects, the downlink beam is initialized with a maximum number of antenna elements, and wherein modifying the beam level comprises modifying the beam level by decreasing a number of active antenna elements associated with the downlink beam.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
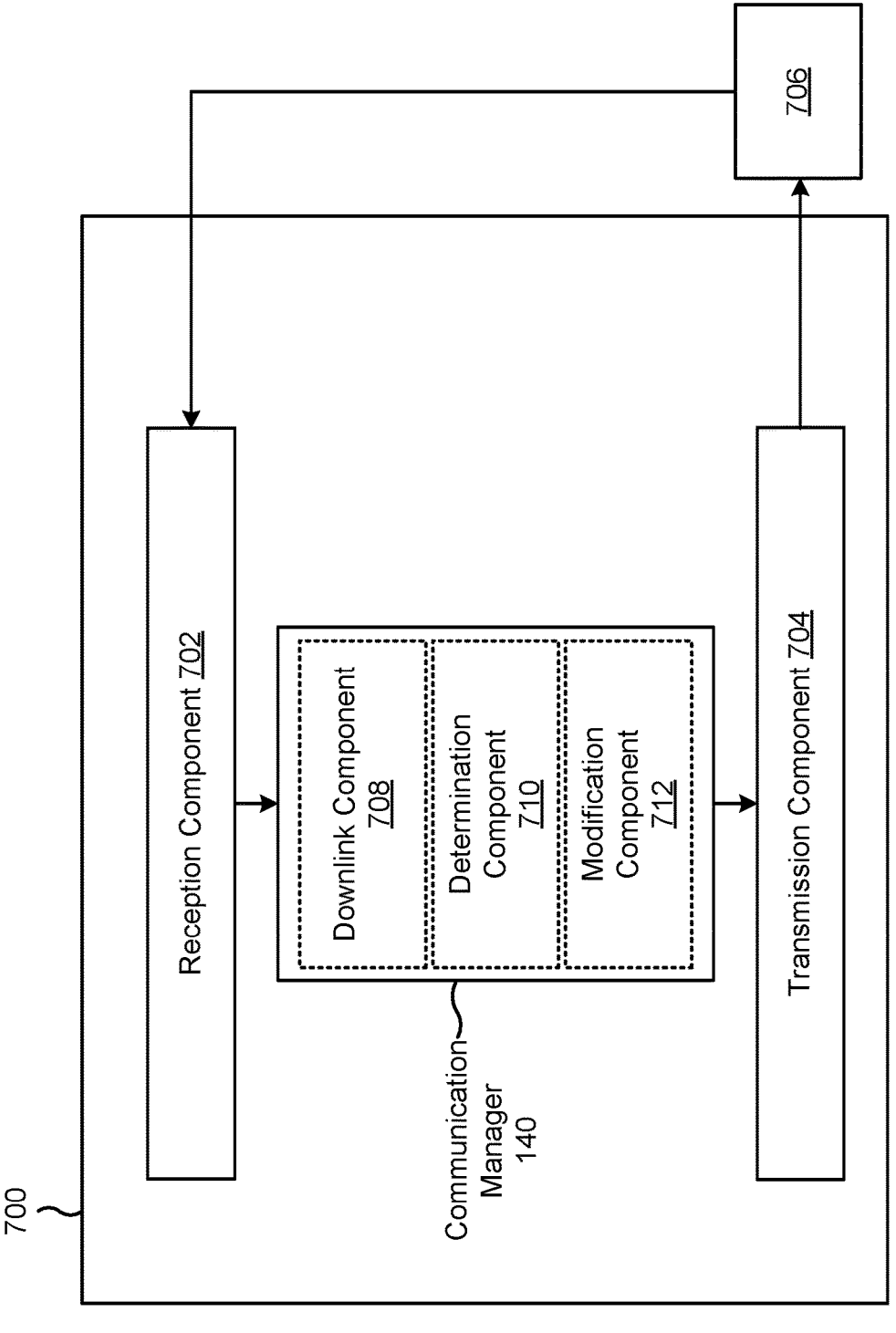
FIG. 7 is a diagram of an example apparatus for wireless communication in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3-5. Additionally or alternatively, the apparatus 700 may be configured to perform one or more processes described herein, such as process 600 of FIG. 6. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may obtain, in association with a downlink beam for receiving downlink communications, downlink information indicating at least one of an amount of downlink traffic to be received by the UE via the downlink beam, at least one channel quality metric associated with the downlink beam, or an application downlink throughput metric associated with one or more applications of the UE. The communication manager 140 may modify a beam level associated with the downlink beam based at least in part on the downlink information. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a downlink component 708, a determination component 710, a modification component 712, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The downlink component 708 may obtain, in association with a downlink beam for receiving downlink communications, downlink information indicating at least one of an amount of downlink traffic to be received by the UE via the downlink beam, at least one channel quality metric associated with the downlink beam, or an application downlink throughput metric associated with one or more applications of the UE. The modification component 712 may modify a beam level associated with the downlink beam based at least in part on the downlink information.

The determination component 710 may determine that the beam level is to be modified based at least in part on the downlink information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: obtaining, in association with a downlink beam for receiving downlink communications, downlink information indicating at least one of: an amount of downlink traffic to be received by the UE via the downlink beam, at least one channel quality metric associated with the downlink beam, or an application downlink throughput metric associated with one or more applications of the UE; and modifying a beam level associated with the downlink beam based at least in part on the downlink information.

Aspect 2: The method of Aspect 1, further comprising: determining that the beam level is to be modified based at least in part on the downlink information; and wherein modifying the beam level comprises: modifying the beam level based at least in part on the determination that the beam level is to be modified. wherein modifying the beam level comprises: modifying the beam level based at least in part on the determination that the beam level is to be modified.

Aspect 3: The method of Aspect 2, wherein determining that the beam level is to be modified comprises: determining to increase the beam level based at least in part on at least one of: at least one downlink traffic metric satisfying at least one downlink traffic threshold, the at least one channel quality metric satisfying at least one channel quality threshold, or the application downlink throughput metric satisfying an application throughput threshold.

Aspect 4: The method of Aspect 2, wherein determining that the beam level is to be modified comprises: determining to decrease the beam level based at least in part on at least one of: at least one downlink traffic metric satisfying at least one downlink traffic threshold, the at least one channel quality metric satisfying at least one channel quality threshold, or the application downlink throughput metric satisfying an application throughput threshold.

Aspect 5: The method of any of Aspects 1-4, wherein modifying the beam level comprises: increasing a number of active antenna elements associated with the downlink beam, or decreasing a number of active antenna elements associated with the downlink beam.

Aspect 6: The method of any of Aspects 1-5, wherein the amount of downlink traffic is indicated by at least one of: a quantity of downlink grants received by the UE in downlink communications received by the UE within a period of time, a quantity of allocated resource blocks in downlink communications received by the UE within a period of time, a transport block size of downlink communications received by the UE within a period of time, or padding included in one or more of the downlink grants.

Aspect 7: The method of any of Aspects 1-6, wherein the at least one channel quality metric comprises at least one of: a reference signal received power metric, a signal-to-noise ratio metric, a spectral efficiency metric, or a throughput metric.

Aspect 8: The method of any of Aspects 1-7, wherein the application downlink throughput metric indicates one of a plurality of tiered throughput categories associated with the one or more applications.

Aspect 9: The method of any of Aspects 1-8, wherein obtaining the downlink information includes performing beam sweeping to collect the downlink information.

Aspect 10: The method of any of Aspects 1-9, wherein the downlink beam is initialized with a maximum number of antenna elements, and wherein modifying the beam level comprises: modifying the beam level by decreasing a number of active antenna elements associated with the downlink beam.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:

obtaining, in association with a downlink beam for receiving downlink communications, downlink information indicating an application downlink throughput metric associated with one or more applications of the UE and an amount of downlink traffic to be received by the UE via the downlink beam, wherein the application downlink throughput metric is a different metric than the amount of downlink traffic to be received, and wherein the amount of downlink traffic to be received is indicated by at least one of:

a quantity of downlink grants received by the UE in downlink communications received by the UE within a period of time, a quantity of allocated resource blocks in downlink communications received by the UE within a period of time, a transport block size of downlink communications received by the UE within a period of time, or padding included in one or more of the downlink grants; and modifying a beam level associated with the downlink beam based at least in part on the downlink information by increasing or decreasing a number of active antenna elements associated with the downlink beam, wherein the number of active antenna elements is decreased based at least in part the application downlink throughput metric satisfying an application downlink throughput threshold and the amount of downlink traffic to be received satisfying a downlink traffic threshold.

2. The method of claim 1, further comprising:

determining that the beam level is to be modified based at least in part on the downlink information; and wherein modifying the beam level comprises:

modifying the beam level based at least in part on the determination that the beam level is to be modified.

3. The method of claim 2, wherein determining that the beam level is to be modified comprises:

determining to increase or decrease the beam level based at least in part on whether at least one of:

at least one downlink traffic metric satisfies at least one downlink traffic threshold, at least one channel quality metric, associated with the downlink beam, satisfies at least one channel quality threshold, or the application downlink throughput metric satisfies the application downlink throughput threshold.

4. The method of claim 1, wherein the downlink information further indicates at least one channel quality metric associated with the downlink beam, and wherein the at least one channel quality metric comprises at least one of:

a reference signal received power metric, a signal-to-noise ratio metric, a spectral efficiency metric, or a throughput metric.

5. The method of claim 1, wherein the application downlink throughput metric indicates one of a plurality of tiered throughput categories associated with the one or more applications.

6. The method of claim 1, wherein obtaining the downlink information includes performing beam sweeping to collect the downlink information.

7. The method of claim 1, wherein the downlink beam is initialized with a maximum number of antenna elements.

8. A user equipment (UE) for wireless communication, comprising:

one or more memories; and one or more processors, coupled to the one or more memories, configured to:

obtain, in association with a downlink beam for receiving downlink communications, downlink information indicating an application downlink throughput metric associated with one or more applications of the UE and an amount of downlink traffic to be received by the UE via the downlink beam, wherein the application downlink throughput metric is a different metric than the amount of downlink traffic to be received, and wherein the amount of downlink traffic to be received is indicated by at least one of:

a quantity of downlink grants received by the UE in downlink communications received by the UE within a period of time, a quantity of allocated resource blocks in downlink communications received by the UE within a period of time, a transport block size of downlink communications received by the UE within a period of time, or padding included in one or more of the downlink grants; and modify a beam level associated with the downlink beam based at least in part on the downlink information, wherein the one or more processors, to modify the beam level, are configured to:

decrease a number of active antenna elements associated with the downlink beam based at least in part the application downlink throughput metric satisfying an application downlink throughput threshold and the amount of downlink traffic to be received satisfying a downlink traffic threshold.

9. The UE of claim 8, wherein the one or more processors are further configured to:

determine that the beam level is to be modified based at least in part on the downlink information; and wherein the one or more processors, to modify the beam level, are configured to:

modify the beam level based at least in part on the determination that the beam level is to be modified.

10. The UE of claim 9, wherein the one or more processors, to determine that the beam level is to be modified, are configured to:

determine to increase or decrease the beam level based at least in part on whether at least one of:

at least one downlink traffic metric satisfies at least one downlink traffic threshold, at least one channel quality metric, associated with the downlink beam, satisfies at least one channel quality threshold, or the application downlink throughput metric satisfies the application downlink throughput threshold.

11. The UE of claim 8, wherein the one or more processors, to modify the beam level, are configured to:

increase the number of active antenna elements associated with the downlink beam based at least in part the application downlink throughput metric not satisfying the application downlink throughput threshold.

12. The UE of claim 8, wherein the downlink information further indicates at least one channel quality metric associated with the downlink beam, and wherein the at least one channel quality metric comprises at least one of:

a reference signal received power metric, a signal-to-noise ratio metric, a spectral efficiency metric, or a throughput metric.

13. The UE of claim 8, wherein the application downlink throughput metric indicates one of a plurality of tiered throughput categories associated with the one or more applications.

14. The UE of claim 8, wherein the one or more processors, to obtain the downlink information, are configured to perform beam sweeping to collect the downlink information.

15. The UE of claim 8, wherein the downlink beam is initialized with a maximum number of antenna elements.

16. A non-transitory computer-readable medium storing a set of instructions for wireless communication, the set of instructions comprising:

one or more instructions that, when executed by one or more processors of a user equipment (UE), cause the UE to:

obtain, in association with a downlink beam for receiving downlink communications, downlink information indicating an application downlink throughput metric associated with one or more applications of the UE and an amount of downlink traffic to be received by the UE via the downlink beam, wherein the application downlink throughput metric is a different metric than the amount of downlink traffic to be received, and wherein the amount of downlink traffic to be received is indicated by at least one of:

a quantity of downlink grants received by the UE in downlink communications received by the UE within a period of time, a quantity of allocated resource blocks in downlink communications received by the UE within a period of time, a transport block size of downlink communications received by the UE within a period of time, or padding included in one or more of the downlink grants; and modify a beam level associated with the downlink beam based at least in part on the downlink information, wherein the one or more instructions, to cause the UE to modify the beam level, are configured to cause the UE to:

decrease a number of active antenna elements associated with the downlink beam based at least in part the application downlink throughput metric satisfying an application downlink throughput threshold and the amount of downlink traffic to be received satisfying a downlink traffic threshold.

17. The non-transitory computer-readable medium of claim 16, wherein the one or more instructions further cause the UE to:

determine that the beam level is to be modified based at least in part on the downlink information; and wherein the one or more instructions, that cause the UE to modify the beam level, cause the UE to:

modify the beam level based at least in part on the determination that the beam level is to be modified.

18. The non-transitory computer-readable medium of claim 17, wherein the one or more instructions, that cause the UE to determine that the beam level is to be modified, cause the UE to:

determine to increase or decrease the beam level based at least in part on whether at least one of:

at least one downlink traffic metric satisfies at least one downlink traffic threshold, at least one channel quality metric, associated with the downlink beam, satisfies at least one channel quality threshold, or the application downlink throughput metric satisfies the application downlink throughput threshold.

19. The non-transitory computer-readable medium of claim 16, wherein the one or more instructions, that cause the UE to modify the beam level, cause the UE to:

increase the number of active antenna elements associated with the downlink beam based at least in part the application downlink throughput metric not satisfying the application downlink throughput threshold.

20. The non-transitory computer-readable medium of claim 16, wherein the downlink information further indicates at least one channel quality metric associated with the downlink beam, and wherein the at least one channel quality metric comprises at least one of:

a reference signal received power metric, a signal-to-noise ratio metric, a spectral efficiency metric, or a throughput metric.

21. The non-transitory computer-readable medium of claim 16, wherein the application downlink throughput metric indicates one of a plurality of tiered throughput categories associated with the one or more applications.

22. The non-transitory computer-readable medium of claim 16, wherein the downlink beam is initialized with a maximum number of antenna elements.

23. An apparatus for wireless communication, comprising:

means for obtaining, in association with a downlink beam for receiving downlink communications, downlink information indicating an application downlink throughput metric associated with one or more applications of the apparatus and an amount of downlink traffic to be received by the apparatus via the downlink beam, wherein the application downlink throughput metric is a different metric than the amount of downlink traffic to be received, and wherein the amount of downlink traffic to be received is indicated by at least one of:

a quantity of downlink grants received by the apparatus in downlink communications received by the apparatus within a period of time, a quantity of allocated resource blocks in downlink communications received by the apparatus within a period of time, a transport block size of downlink communications received by the apparatus within a period of time, or padding included in one or more of the downlink grants; and means for modifying a beam level associated with the downlink beam based at least in part on the downlink information by increasing or decreasing a number of active antenna elements associated with the downlink beam, wherein the number of active antenna elements is decreased based at least in part the application downlink throughput metric satisfying an application downlink throughput threshold and the amount of downlink traffic to be received satisfying a downlink traffic threshold.

24. The non-transitory computer-readable medium of claim 16, wherein the one or more instructions, that cause the UE to obtain the downlink information, cause the UE to:

perform beam sweeping to collect the downlink information.

25. The apparatus of claim 23, further comprising:

means for determining that the beam level is to be modified based at least in part on the downlink information; and wherein the means for modifying the beam level comprises:

means modifying the beam level based at least in part on the determination that the beam level is to be modified.

26. The apparatus of claim 25, wherein the means for determining that the beam level is to be modified comprises:

means for determining to increase or decrease the beam level based at least in part on whether at least one of:

at least one downlink traffic metric satisfies at least one downlink traffic threshold, at least one channel quality metric, associated with the downlink beam, satisfies at least one channel quality threshold, or the application downlink throughput metric satisfies the application downlink throughput threshold.

27. The apparatus of claim 23, wherein the downlink information further indicates at least one channel quality metric associated with the downlink beam, and wherein the at least one channel quality metric comprises at least one of:

a reference signal received power metric, a signal-to-noise ratio metric, a spectral efficiency metric, or a throughput metric.

28. The apparatus of claim 23, wherein the application downlink throughput metric indicates one of a plurality of tiered throughput categories associated with the one or more applications.

29. The apparatus of claim 23, wherein the means for obtaining the downlink information includes:

means for performing beam sweeping to collect the downlink information.

30. The apparatus of claim 23, wherein the downlink beam is initialized with a maximum number of antenna elements.

* * * * *